UNITED STATES PATENT OFFICE.

CHARLES LEHMAN HART, OF CHICAGO, ILLINOIS, ASSIGNOR TO THE CHICAGO CRESCENT COMPANY, OF SAME PLACE.

MANUFACTURE OF CRYPTO-MALT.

SPECIFICATION forming part of Letters Patent No. 536,346, dated March 26, 1895.

Application filed July 23, 1894. Serial No. 518,375. (No specimens.)

*To all whom it may concern:*

Be it known that I, CHARLES LEHMAN HART, a resident of Chicago, county of Cook, and State of Illinois, have invented certain new and useful Improvements in the Manufacture of Koji, of which the following is hereby declared to be a full, clear, and exact description, sufficient to enable others to practice said invention.

In the preparation of worts or mashes such as are used *e. g.*, by brewers and distillers the agent generally employed for starch conversion is malt or mineral acid. As a substitute agent the invention designs to employ koji (so-called) which has been grown upon a granular inert supplemental base. Under prescribed conditions of heat and moisture the spores of a wide range of the cryptogamia may be caused to thrive notably upon starchy materials as a nutrient base and if the growth be arrested at a proper stage the resultant product will be found to possess high diastatic qualities. The invention proposes to utilize this fact by providing a starchy nutrient (by preference) in quantity sufficient for the abundant growth of the sown spores. The nutrient medium being suitably prepared and intermixed together with the proper spores upon a granular supplemental inert base (*e. g.*, clean sifted sand), the mixture remains exposed at such heat and moisture most suited for the rapid development of the spores. A mold like growth results which can be checked at what experience shows to be the best stage for the elaboration of the resulting diastase and on separating the inert base, the product (which is koji) becomes at once available for use as a starch-converter.

Among other of the cryptogamia readily adapted to the processes may be cited the spores of parasitic smuts, *e. g.*, such as are native to maize (*Ustilago zeae mays*), to wheat, (*Ustilago tritici*), to rye (*Claviceps purpurea*), to barley (*Ustilago hordei*) and to oats (*Ustilago avenae*); also, by selecting the spores of edible mushroom (*Agaricus campestris* and *marasmus oreades*) and of the common puff-ball of the pasture fields (*Bovista ammophila*). Besides these there are doubtless many more which investigation may show to be susceptible to growth upon starchy nutrients as a base proper.

A certain specific sort of koji has been heretofore produced by growing the spores of rice smut (*Aspergillus oryzae*) upon (1) rice grains or (2) the bran of cereals. The spores occur in commerce as a yellowish-green powder termed moyashi and the koji resulting from the arrrested growth of the moyashi upon the steamed base has been applied to starch conversion either (*a*) directly, when obtained on rice or else (*b*) indirectly, by making a water-extract if the koji be grown upon the bran; the resultant solution being employed for attacking the starch of the slop or mash. By one method (1), the rice served not only as a nutrient but as a granular porous base exposed freely to the air and, because of its state, highly favorable to the rapid spread of the plant. By the other method (2), the nutrient supply was made to depend upon such of the starchy material as was adherent to the bran while the bran itself served as a porous supporting base for the plant growth. In the first method (1) the excess of rice-grain, constituting the supporting base went bodily into the mash together with the koji proper, and was apt to introduce objectionable ingredients. Aside from first cost of the rice excess the conversion of the starch and the fermentation of the mash subsequently occurring were unusually protracted. By the second method (2) although the bran was excluded, its organic unstable character tended always to introduce deleterious constituents into the water-extract while the residuum of sodden bran was most susceptible to decay. Expensive machinery, *e. g.*, presses, conveyers, driers, &c., were necessary to save the bran for further use. Under the best conditions it could not be safely re-utilized more than once or twice. The bran was exposed to the infection of wild or acetic growths and besides sank rapidly to the state of refuse.

My invention employs a definite amount of the starch base, sufficient for proper yield of the koji, at a cost not exceeding the cost of bran for a corresponding yield. It avoids the presence of a superfluous (and expensive) quantity of the rice grain and by reason of the inert character of the supplemental granular supporting base quite eliminates the difficulties, risks, delays, and charges attendant upon the employment of bran.

KOJI.

I. *Ingredients—Starch base.*—In customary practice the finer sort of wheat middlings or maize flour is selected for the starch base. Besides these it is manifest that the flour of rice, barley, rye or other cereals, peas, potatoes, beans, &c., may be used instead. Starchy materials which properly gelatinize and coat the particles of inert base, on admixture, are suggested by preference as food for the plant growth and where economy permits are ready substitutes for each other. Materials like bran which contain a large amount of woody fiber, hulls or husks are inadmissible because these bulky constituents remain to clog the inert base and are in kind open to the same objections which pertain to the use of bran alone.

*Inert supplemental base.*—For the supplemental inert base clean sifted sand is an excellent material; but any granular substance other than sand which remains inert at the end of the growing treatment, so as to be quickly cleaned, sterilized and dried (if necessary) and which can commingle with the starch medium and be thoroughly coated therewith will serve instead. When once prepared of proper fineness, the inert base is capable of indefinite re-use should that be desired. The sand is always sweet and clean, compact and easily handled and thus markedly saves in cost, risks and care what the employment of bran rendered necessary.

*Spores.*—The crypto-spores taken may be of various sort as already indicated. Ordinarily, maize-smut (*Ustilago maydis*) affords satisfactory results but other of the cryptogamic spores can be selected. The quantity and mode of procedure does not differ essentially whichever sort of spore be taken. Indeed, it is entirely feasible to employ the germs of brewer's yeast (*Saccharomyces cervisæ*) as a substitute for the spores proper since the change in condition from water to air will transform the yeast germs or at least cause a distinctive mold growth to ensue upon the starch base and produce a definite koji.

II. *Preparing the batch.*—Starch-base, ten to five pounds; supplemental base, (sand,) ninety to ninety-five pounds; water, ten pounds; spores, one to one-half grams. To ninety to ninety-five pounds, of sand there is added water (*e. g.*, ten pounds) in volume sufficient to moisten without saturating the sand. The starch-base (*e. g.*, ten to five pounds.) is then thoroughly admixed and the mass heated either in a closed steamer under pressure or what is generally satisfactory, in an open vessel supplying live steam through a vented coil-pipe located within the tub. Steam treatment for thirty to sixty minutes serves to thoroughly sterilize the batch and as well to break up the starch cells which are distributed as a gelatinized coating over the particles of sand. The mass drops out of the steamer in a granular state, not adherent to the vessel, and is slightly moist to the touch. On cooling to about 100° Fahrenheit, the spores of maize-smut are added, say one to one-half gram for a one hundred pound batch. The spores are usually first mixed into a separated quantity of the batch so as to be better handled for even distribution.

III. *Growing.*—The prepared batch is now spread in loose condition to a depth of about one-half to one and one-half inches, upon a number of wooden trays, of a size convenient for easy handling, these trays being piled in tiers (with air-space between) in a growing room where a humid atmosphere of 76° to 80° Fahrenheit, is maintained. The growing room is usually darkened and instead of the trays may be furnished with floors familiar to malt-houses and upon which the batch can be spread. If a depth greater than one-half inch is given to the batch, the internal heat evolved by the growing plant compels greater care to insure a humid atmosphere and may require stirring of the mass at times to cool it below 110° Fahrenheit, which is a safety limit against plant injury. The higher room temperature promotes a speedy growth yet tends also to dry the batch and it is difficult to maintain all parts of the room in uniform state as to heat and moisture. While the room temperature may be 90° Fahrenheit, or even higher it always demands closer attention from the operator and is besides more wasteful in steam. The excessive quantity of bran formerly used is here replaced by an inert base so that the risks of organic decomposition are avoided; temperature and humidity are consequently under better control and in general the cultivation proceeds with greater uniformity and under conditions which more certainly prevent the development of "wild" growths and other objectionable characteristics. After some thirty-six to fifty-two hours the growth has advanced until incipient white conidia develop and show upon and throughout the mass, this being matted and interlocked together by the spread of the mycelium. The moisture is thereupon shut off so that the atmosphere of the growing-room is no longer humid while a temperature of 76° to 80° Fahrenheit, is still maintained. This speedily dries the material leaving it in readiness to be carried off to storage bins (in a cool, dry place) or else and even without drying, the growth can be carried directly to the leaching tubs.

IV. *Mature spores.*—To obtain a crop of spores it is only necessary that the growth of the batch be continued under like conditions beyond the koji stage say for a whole period of seventy two to one hundred and twenty hours. The spores begin to mature even earlier but an abundant yield is attained by the more protracted growth. Variations in moisture and temperature operate to vary the time required for producing the desired result and a larger quantity of the starch-base is taken, as indicated in the formula, when the purpose is to obtain a fresh culture crop for re-sowing.

In the case of maize-smut if the mycelium be fully grown and the spores have matured the batch presents a yellowish green appearance. The moisture is then shut off and the mass thoroughly dried at a temperature of about 80° Fahrenheit, after which it is stored in bulk in a cool, dry place or else bolted through a fine wire sieve to screen out the spores or powder. The powder is put in air-tight cans and kept cool and dry. The material thus obtained is practically free from organic impurities and if left in bulk has but little tendency to absorb moisture or to deteriorate since foreign ingredients are essentially absent. The excess of starch base or the bran left over by the older methods of growing moyashi were on the contrary peculiarly susceptible to decay and endangered the crop and this too—but in less degree—although a partial separation by sifting had been observed.

Instead of sowing spores into the batch, as already detailed, it is entirely feasible to intermix a portion (e. g., by weight two to five per cent.) of a prior growth yet remaining on the sand whether this has arrived at the koji or at a later stage. A part of some growing batch can be set aside and (by preference) is allowed to dry when designed for use as a substitute for the spores.

In using brewer's yeast as a source of the spore-growth, about two and one-half pounds, of the commercial yeast cake or compressed yeast is introduced into the batch (one hundred pounds) instead of the prescribed portion of spores. A less quantity of the compressed yeast than of the cake will serve, as the figure stated indicates. The yeast is preferably soaked for about thirty minutes in sufficient water to disintegrate it before admixture.

Under favorable conditions of heat and moisture already stated a sporadic crop of what is to all intents a simple koji may be obtained by free exposure to the surrounding air of the gelatinized starch coating on the inert base. Occasional re-mixing will cool and expedite the sporadic growth. A double quantity of the starch base can be taken. The results lack definiteness in time necessary, and in the nature of the product because of local differences in the atmosphere from whence the spores are derived. In commercial usage this chance mode of sowing the spores would not be preferred.

V. *Leaching.*—The koji having attained the stage of growth most suitable for the production of diastase is thrown, together with its adherent inert base, into a receiving vat where it is flooded with cold water (e. g., 60° to 70° Fahrenheit) and left to steep for e. g., four to six hours. At the expiration of this period the water has dissolved a large amount of the diastase. The extract is tapped off running away as a clear liquor sometimes of opalescent tint to the reservoir. Fresh water is let into the leach-vat to keep the mass flooded while the tap-cock remains open so that the solution may filter through continuously. When the saccharometer shows 0° at 60° Fahrenheit, the extraction is finished. The liquor draining off thereafter has traces of diastase and is saved for use in lixiviating the next batch. A pipe-coil embedded in the mass within the vat may maintain a circulation of water during the extraction process and thus keep down the temperature and deliver a cool or cold liquor at the tap-cock. The liquor thence obtained is in readiness for use to convert starch into sugar in the production of worts or mashes. This latter practice forms no part of the present invention and need not be detailed.

At the close of the leaching the residue left in the vat (consisting essentially of the inert base, i. e., sand) may be dried and sterilized if desired by simply turning a steam supply into the pipe-coil (shutting off the water circulation). Thereafter the base is discharged through the man-hole into the storage bin ready for re-use.

Should the drying of the sand be checked when it is yet slightly moist, it can be economically taken at once for admixture with a fresh supply of starch base in preparing a new batch. The statements as to proportions, degrees of heat, duration of treatment and conditions thereof, heretofore made, are not to be deemed as exclusive or anywise as limitations. The preferred practice only is set forth. Variations from this may occur with good results and without departure from the essentials of the invention.

Having thus described the invention, what I claim as new, and desire to secure by Letters Patent, is—

1. The method of obtaining koji for starch conversion which consists in subjecting a moist granular inert supplemental base having a nutrient base coating thereon in admixture with the requisite spores, to humid air circulating at proper temperature, (occasionally stirring the granular mass if necessary,) and when the resultant plant growth has attained its diastase stage, separating the koji product from its inert base, substantially as described.

2. The method of obtaining koji for starch conversion which consists in subjecting a moist granular inert supplemental base such as sand having a nutrient base coating of gelatinized starch thereon in admixture with the requisite spores, to humid air circulating at proper temperature, (occasionally stirring the granular mass if necessary,) and when the resultant plant growth has attained its diastase stage, separating the koji product from its inert base, substantially as described.

3. In the production of koji for starch conversion the method of growing a spore-crop which consists in subjecting a moist granular inert supplemental base having a gelatinized nutrient base coating thereon in admixture with the requisite spores, to humid air circulating at proper temperature, (occasionally stirring the granular mass if necessary) and when the resultant plant-growth and its crypto-spores are suitably matured, separating the crop from the inert supplemental base, substantially as described.

CHARLES LEHMAN HART.

Witnesses:
JAMES H. PEIRCE,
ALBERTA ADAMICK.